US010922285B1

(12) United States Patent
Smith et al.

(10) Patent No.: US 10,922,285 B1
(45) Date of Patent: Feb. 16, 2021

(54) TABLE DATA PERSISTENCE

(71) Applicant: Pivotal Software, Inc., San Francisco, CA (US)

(72) Inventors: Daniel Allen Smith, Portland, OR (US); Anthony M. Baker, Sherwood, OR (US); Sumedh Wale, Maharashtra (IN); Hemant Bhanawat, Maharashtra (IN); Jagannathan Ramnarayanan, Portland, OR (US); Swapnil Prakash Bawaskar, Hillsboro, OR (US); Ashvin Agrawal, Cupertino, CA (US); Neeraj Kumar, Maharashtra (IN)

(73) Assignee: Pivotal Software, Inc., San Francisco, CA (US)

( * ) Notice: Subject to any disclaimer, the term of this patent is extended or adjusted under 35 U.S.C. 154(b) by 888 days.

(21) Appl. No.: 15/583,736

(22) Filed: May 1, 2017

Related U.S. Application Data (63) Continuation of application No. 14/526,347, filed on Oct. 28, 2014, now Pat. No. 9,639,544.
(Continued)

(51) Int. Cl.
*G06F 16/182* (2019.01)
*G06F 16/14* (2019.01)
(Continued)

(52) U.S. Cl.
CPC .......... *G06F 16/183* (2019.01); *G06F 16/148* (2019.01); *G06F 16/2282* (2019.01);
(Continued)

(58) Field of Classification Search
CPC ............ G06F 16/182; G06F 16/24542; G06F 16/24564; G06F 16/25; G06F 16/284; G06F 16/93; G06F 16/183
(Continued)

(56) References Cited

U.S. PATENT DOCUMENTS

| | | | | |
|---|---|---|---|---|
| 5,276,867 A | * | 1/1994 | Kenley | ................... G06F 16/10 |
| 5,638,509 A | * | 6/1997 | Dunphy | .............. G06F 11/1458 |
| | | | | 714/20 |

(Continued)

OTHER PUBLICATIONS

Pivotal, "Pivotal GemFire XB User's Guide," Pivotal™ GemFire XD®, Published Sep. 12, 2014, pp. 130-151.

*Primary Examiner* — Shahid A Alam
(74) *Attorney, Agent, or Firm* — Fish & Richardson P.C.

(57) ABSTRACT

Methods, systems, and apparatus, including computer programs encoded on computer storage media, for a distributed parallel processing database system that persists table data in memory to a distributed file system. A distributed parallel processing database system persists table data in memory to a distributed file system. A parameter of creating a database table specifies that data records in the database table and history of changes to the data records can be stored in memory as well as in the distributed file system. When the database table is populated or otherwise modified, data records and the history in memory are evicted to the distributed file system as log files and removed from memory. The log files can be designated as write-only, where the data records, once written, cannot be read by structured query language (SQL) queries, or as read-write, where the data records, once written, can be read by SQL queries.

15 Claims, 5 Drawing Sheets

Related U.S. Application Data (60) Provisional application No. 61/896,593, filed on Oct. 28, 2013.

(51) Int. Cl.
*G06F 16/22* (2019.01)
*H04L 29/08* (2006.01)
*G06F 16/23* (2019.01)
*H04L 29/06* (2006.01)

(52) U.S. Cl.
CPC ...... *G06F 16/2379* (2019.01); *H04L 67/1095* (2013.01); *H04L 67/1097* (2013.01); *H04L 67/42* (2013.01)

(58) Field of Classification Search
USPC ......................................................... 707/704
See application file for complete search history.

(56) References Cited

U.S. PATENT DOCUMENTS

| | | | |
|---|---|---|---|
| 6,029,170 A * | 2/2000 | Garger | G06F 16/2246 707/669 |
| 6,449,688 B1 * | 9/2002 | Peters | G06F 11/1076 711/112 |
| 6,523,036 B1 | 2/2003 | Hickman | |
| 6,549,992 B1 * | 4/2003 | Armangau | G06F 11/1456 707/999.202 |
| 6,711,562 B1 * | 3/2004 | Ross | G06F 16/2246 707/741 |
| 6,785,768 B2 * | 8/2004 | Peters | G06F 16/184 711/112 |
| 6,829,610 B1 | 12/2004 | Hickman | |
| 6,871,272 B2 * | 3/2005 | Butterworth | G06F 3/0608 707/999.202 |
| 7,124,152 B2 * | 10/2006 | Fish | G06F 16/9574 |
| 7,831,772 B2 | 11/2010 | Nalawade | |
| 8,832,132 B1 * | 9/2014 | Spertus | G06F 16/3337 707/765 |
| 8,873,572 B2 | 10/2014 | Bahr et al. | |
| 9,047,355 B2 | 6/2015 | Ferguson et al. | |
| 2003/0198381 A1 | 10/2003 | Tanaka et al. | |
| 2004/0098427 A1 | 5/2004 | Peng et al. | |
| 2004/0205048 A1 | 10/2004 | Pizzo | |
| 2004/0243593 A1 * | 12/2004 | Stolte | G06F 16/248 |
| 2005/0177552 A1 * | 8/2005 | Bass | H04L 45/742 |
| 2005/0222931 A1 | 10/2005 | Mamou et al. | |
| 2006/0005013 A1 | 1/2006 | Huitema et al. | |
| 2006/0059253 A1 | 3/2006 | Goodman et al. | |
| 2006/0271557 A1 | 11/2006 | Harward et al. | |
| 2007/0061444 A1 | 3/2007 | Venkatesan et al. | |
| 2007/0203910 A1 | 8/2007 | Ferguson et al. | |
| 2008/0126357 A1 | 5/2008 | Casanova et al. | |
| 2008/0208820 A1 | 8/2008 | Usey et al. | |
| 2010/0010967 A1 | 1/2010 | Muller et al. | |
| 2010/0023805 A1 | 1/2010 | Colaiacomo | |
| 2010/0121817 A1 | 5/2010 | Meyer et al. | |
| 2010/0195655 A1 * | 8/2010 | Jacobson | H04L 45/00 370/392 |
| 2010/0257198 A1 * | 10/2010 | Cohen | G06F 16/24564 707/770 |
| 2012/0059963 A1 | 3/2012 | Pasupuleti et al. | |
| 2012/0254193 A1 * | 10/2012 | Chattopadhyay | G06F 16/245 707/747 |
| 2012/0284587 A1 | 11/2012 | Yu et al. | |
| 2013/0110778 A1 | 5/2013 | Taylor et al. | |
| 2013/0124466 A1 * | 5/2013 | Naidu | G06F 16/235 707/610 |
| 2013/0163659 A1 | 6/2013 | Sites | |
| 2013/0311421 A1 * | 11/2013 | Erdogan | G06F 16/273 707/609 |
| 2014/0149485 A1 | 5/2014 | Sharma et al. | |

\* cited by examiner

TABLE DATA PERSISTENCE

CROSS-REFERENCE TO RELATED APPLICATIONS

This application is a continuation application of, and claims priority to, pending U.S. patent application Ser. No. 14/526,347, filed Oct. 28, 2014, entitled "Table Data Persistence", which claims priority to U.S. Provisional Patent Application No. 61/896,593, filed Oct. 28, 2013, entitled "Table Data Persistence". The entirety of the prior applications is hereby incorporated by reference.

BACKGROUND

This specification relates to cloud computing.

In cloud computing, data can be distributed to and processed by a system of multiple computers connected by one or more communications networks. Each computer processes a portion of the data. The computers can process the data in parallel. Such a distributed system can handle web-oriented and data-intensive applications deployed in a virtualized environment. For example, a distributed system can be configured to perform functions of a relational database management system (RDBMS) over the Internet. Some challenges of a distributed system replacing a conventional RDBMS include performing data synchronization among multiple computers in the system, achieving low latency over a wide area network (WAN), scalability, and handling different schemas of multiple users.

SUMMARY

A distributed parallel processing database system persists table data in memory to a distributed file system. A parameter of creating a database table specifies that data records in the database table and history of changes to the data records can be stored in memory as well as in the distributed file system. When the database table is populated or otherwise modified, data records and the history in memory are evicted to the distributed file system as log files and removed from memory. The log files can be designated as write-only, where the data records, once written, cannot be read by structured query language (SQL) queries directly, or as read-write, where the data records, once written, can be read by SQL queries directly.

Particular embodiments of the subject matter described in this specification can be implemented in particular embodiments so as to realize one or more of the following advantages. For example, the techniques described in this specification allow application programs to collect unbounded amounts of data in parallel for future processing. Such ability enables data, e.g., sensor data emitted at a constant high rate, to be processed despite memory constraints of a database system. The techniques described in this specification enables a user to manage very large tables, e.g., hundreds of terabytes (TB) each, beyond the scope of what is possible using conventional technologies of overflowing memory to local disk.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
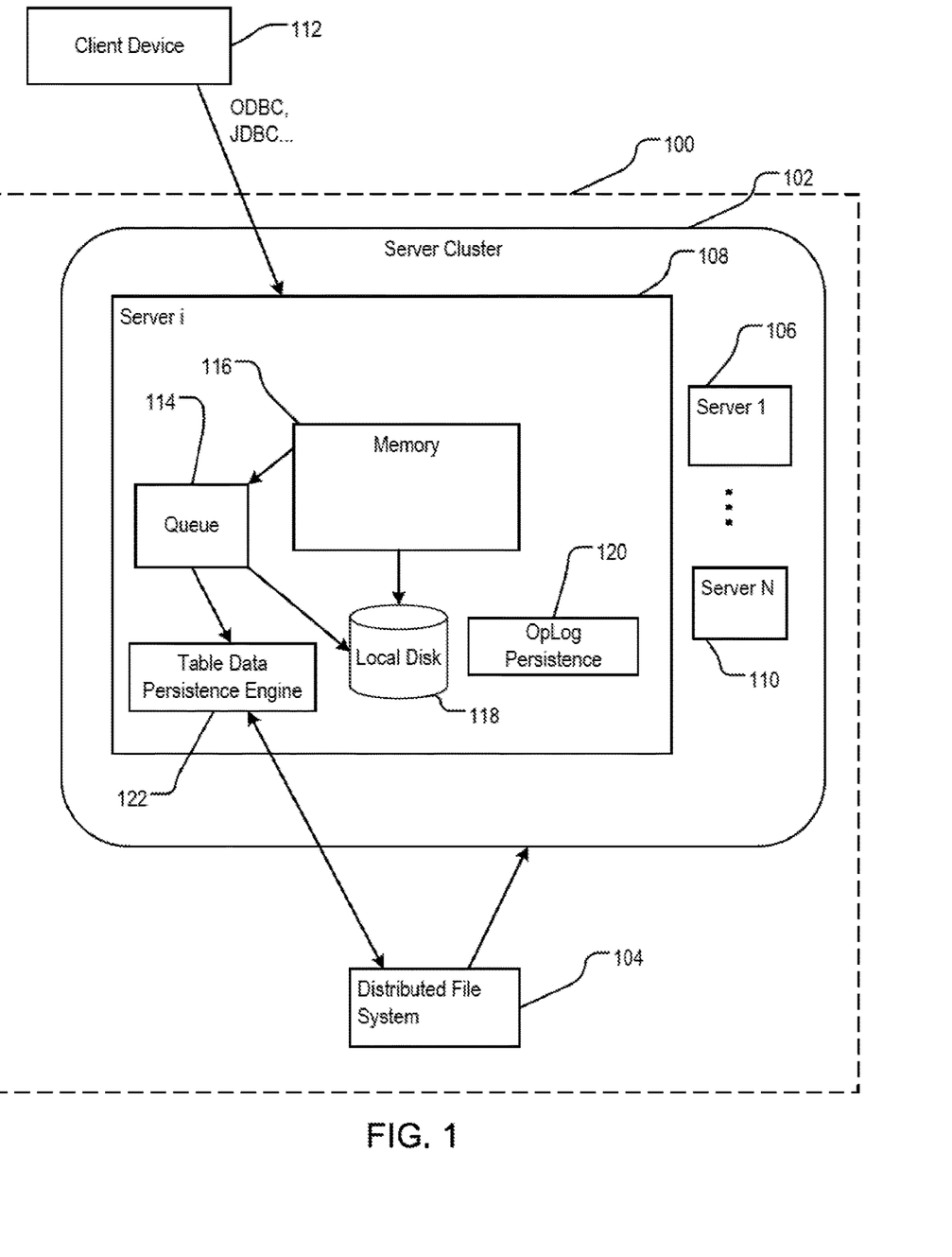
FIG. 1 is a block diagram of an example system implementing table data persistence.

FIG. 1 is a block diagram of an example system 100 implementing off-heap memory management. The system 100 is a memory-optimized, distributed data store configured to perform online transaction processing (OLTP) tasks including, for example, database query processing and data modeling. The system 100 includes a server cluster 102 for in-memory storage and processing of operational data, and a distributed file system 104 for data persistence and scalability. Data persistence includes storing non-operational data on disk. Scalability is an ability of the system 100 to store large volume of data including multiple large files, e.g., files the size of which reaches several terabytes. An example of the distributed file system 104 is the Hadoop™ Distributed File System (HDFS™). ("Hadoop" and "HDFS" are trademarks of the Apache Software Foundation.)

The server cluster 102 includes multiple members. The members are connected to each other through a communications network, e.g., a wide area network (WAN), in a peer-to-peer (P2P) topology. Each peer member maintains persistent communication channels to every other peer member in the server cluster 102. Each member includes a server. Each server includes a server program executing on one or more processors. Each server can access and manage memory and one or more disks local to the one or more processors. Each server can include a Java virtual machine (JVM), or another form of virtual machine, in which data operations are performed. In the example system shown, the members of the server cluster 102 include a first server 106, an i-th server 108, through an N-th server 110. The server cluster 102 can distribute a large database table having multiple data records for storage on the first server 106, i-th server 108, through N-th server 110 by partitioning the database table into logical buckets. Each bucket is a container for data and is associated with one or more servers for storing and processing the data in the container.

The server cluster 102 partitions the database table into the buckets according to a partition strategy associated with the database table, for example, as specified in a "PARTITION BY" clause in a "CREATE TABLE" statement. A data record in the database table can be distributed to one of the buckets based on the partition strategy, e.g., by hashing a primary key in the data record. Each logical bucket can be assigned to one or more of the first server 106, i-th server 108, through N-th server 110. Each of the first server 106, i-th server 108, through N-th server 110 can store a mapping between all clusters and all servers, including which server stores which bucket.

The server cluster 102 is configured to receive a data update request from a client device 112. The data update request can include a structured query language (SQL) statement, or a SQL-like statement, for inserting, deleting, or updating multiple rows of data in a databases table that is distributed among the first server 106, i-th server 108, through N-th server 110. The data update request can be replicated among the first server 106, i-th server 108, through N-th server 110. On each server, e.g., the server 108, the data update request is stored in a queue 114. The queue 114 can store multiple requests that, each in turn, cause data on the portion of the database table distributed to the server 108 to be updated.

The update can occur in memory 116, e.g., when the data being updated is designated as operational data. The data can be designated as operational data by a user, for example, using a data definition language (DDL) extension statement specifying a condition. Additionally or alternatively, the update can occur in the distributed file system 104. For example, when the server 108 ingests a large amount of data, e.g., when the data does not fit into the memory 116, the data can be streamed to the distributed file system 104. In addition, operational data can be evicted from memory and stored in the distributed file system 104.

The server 108 maintains operation logs 120. The operation logs 120 are used by the server 108 to record a history of updates on each database table or on each data record, based on a log setting. The operation logs 120 can be persisted by the server 108 to the local disk 118 or the distributed file system 104 as log files according to the log setting. The operation logs 120 are compacted by the server 108 according to a compaction strategy. For example, a compaction strategy can specify that obsolete operations be removed from a log file when the size of the log file reaches a threshold, e.g., one gigabyte (1 GB). The log setting and compaction strategy can be specified by a user in a configuration file.

The server 108 includes a table data persistence engine 122. The table data persistence engine 122 persists table data stored in memory 116 or local disk 118 to the distributed file system 104. Additional details of persisting the table data are described below in reference to FIG. 2. For convenience, various components and operations are described in reference to the server 108. When system 100 operates, each server in the server cluster 102 may include similar components performing functions as described.

Figure 2:
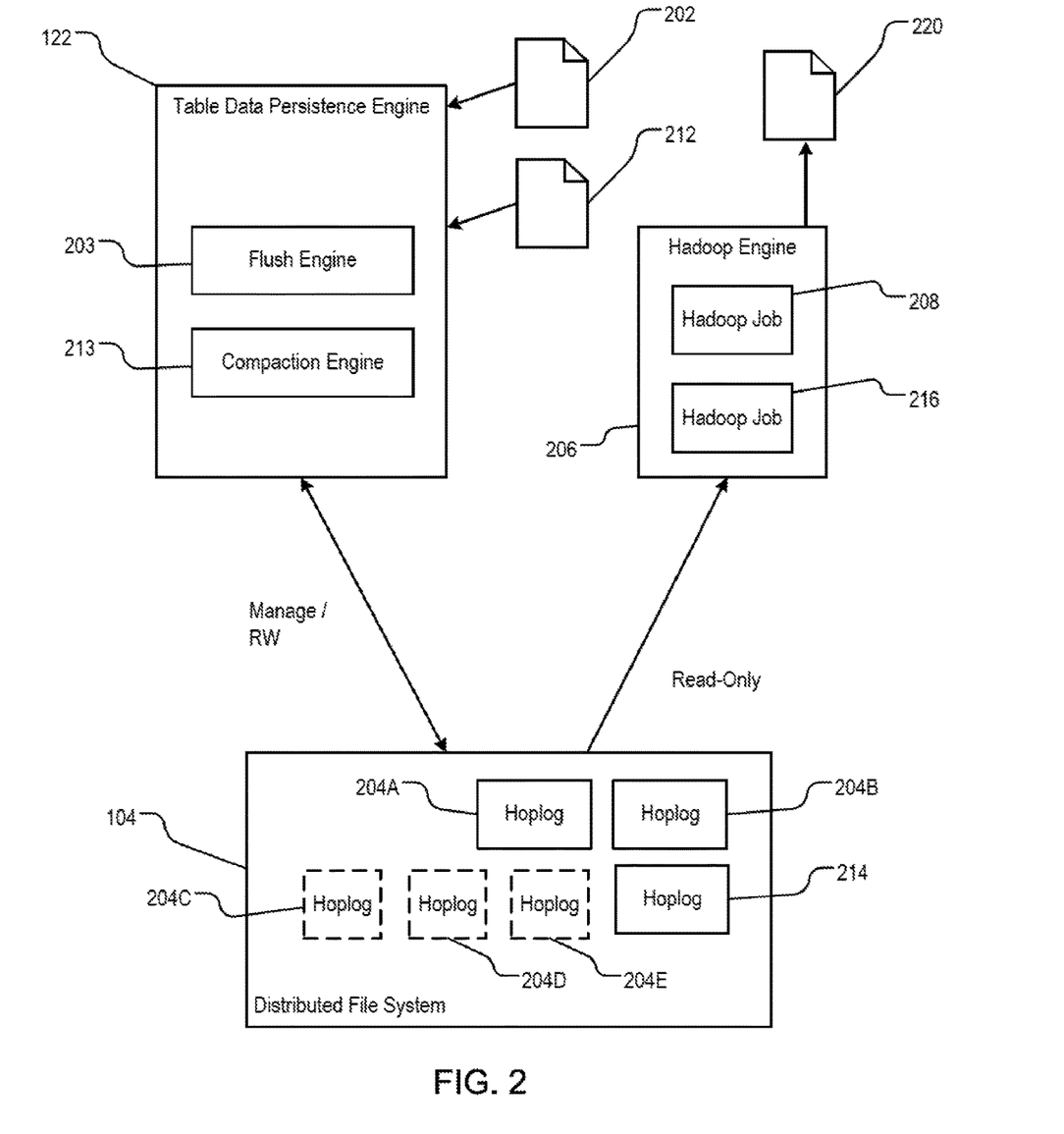
FIG. 2 is a block diagram illustrating components and operations of an example table data persistence engine.

FIG. 2 is a block diagram illustrating components and operations of an example table data persistence engine 122. The table data persistence engine 122 persists table data of a database table 202 to the distributed file system 104 in a write-only mode or a read-write mode. The table data can include values stored in the database table 202 or data manipulation operations performed on the database table 202 or both.

In the write-only mode, the table data persistence engine 122 persists all of data manipulation operations that are applied to the database table 202 to log files, e.g., log files 204A and 204B, on the distributed file system 104. The table data persistence engine 122 may or may not perform compaction on the persisted data in the log files 204A and 204B. Accordingly, the log files 204A and 204B can maintain a complete and uncompacted history of the table operations. A Hadoop™ engine 206 can process the persisted data by executing a Hadoop™ job 208. The Hadoop™ engine 206 can be a MapReduce engine of a Hadoop™ system. The distributed file system 104 can be an HDFS™ component of the Hadoop™ system. The Hadoop™ job 208 can be a MapReduce job.

The persisted data is not directly accessible by a SQL query. A portion of the database table 202 that remains in memory remains accessible by a SQL query. The Hadoop™ engine 206 can include multiple processes distributed to multiple processors, e.g., to processors of the distributed file system 104, the servers 106, 108, through 110, or processors of a separate and standalone system.

The server cluster 102 can use the write-only data persistence to collect a large amount of data that is emitted at a high rate for a sustained period of time. The server cluster 102 can persist the data to one or more data stores. The write-only persistence can be combined with table eviction to address memory constraints of individual members of the server cluster 102. Applications can access and modify data that is current in memory, or data that has been overflowed to the local disk 118 and operation logs 120. The distributed file system 104 stores a history of the table operations. By streaming all operations applied to the database table 202 over time, a user can use Hadoop™ tools to analyze historical information about data values. For example, the user can determine how much a specific value increased or decreased over a range of time using the log files 204A and 204B.

To configure a write-only data store for persisting the database table 202 or other database tables, the table data persistence engine 122 can execute a data store creation command specifying a name of the data store, a node in the distributed file system for the data store, a home directory on the node, a batch size, a batch time interval, a file size, and a roll over interval. An example pseudo command for creating a data store "streamingstore" is shown below in Table 1.

TABLE 1

CREATE DISTRIBUTED_STORE streamingstore
    NameNode '[some_file_system://some_port]'
    HomeDir 'stream-tables'
    BatchSize 10
    BatchTimeInterval 2000
    QueuePersistent true
    MaxWriteOnlyFileSize 200
    WriteOnlyRolloverInterval 1;

The example command causes the table data persistence engine to create a new data store in the specified name node and home directory "stream-tables." A flush engine 203 of the table data persistence engine 122 writes a queue of operations on the database table 202 to the data store in batches as large as 10 megabytes (MB) each as specified in the "BatchSize" parameter. The table data persistence engine 122 flushes the queue to the data store once 2000 milliseconds according to the "BatchTimeInterval" parameter. The flush engine 203 of the table data persistence engine 122 streams all data to the log file 204A until log file 204A reaches a file size of the log file 204A reaches 200 MB according to the "MaxWriteOnlyFileSize", or until log file 204A has been opened for one minute according to the "WriteOnlyRolloverInterval" parameter. Subsequently, the table data persistence engine 122 will open another log file, e.g., log file 204B, for persisting.

The flush engine 203 of the table data persistence engine 122 can stream operations on the database table 202 to the data store "streamingstore" base on the DDL statement that created the database table 202. An example DDL statement for creating the database table 202 is shown below in Table 2.

TABLE 2

CREATE TABLE example_table (
    example_id INT NOT NULL PRIMARY KEY
    example_date DATE NOT NULL
    example_data VARCHAR (2000)  )

TABLE 2-continued

```
PARTITION BY PRIMARY KEY
EVICTION BY LRUHEAPPERCENT
EVICT_ACTION DESTROY
DISTRIBUTED_STORE (streamingstore) WRITEONLY;
```

The example DDL statement creates the database table 202 having a name "example_table." Table data of the database table 202 are persisted to the data store "streamingstore" in write-only mode. The table data persistence engine 122 evicts table data from memory when in-memory data for the database table 202 reaches a critical heap threshold according to the "LRUHEAPPERCENT" parameter. The critical heap threshold is configurable using a system procedure. In this example, the threshold is a percentage of heap memory. When the critical heap threshold is reached, the table data persistence engine 122 evicts one or more least recently used data records.

In the read-write mode the table data persistence engine 122 persists all of data manipulation operations that are applied to the database table 212 to log files, e.g., log files 204C, 204D, and 204E, on the distributed file system 104. A compaction engine 213 of the table data persistence engine 122 compacts log files 204C, 204D, and 204E into one or more larger files, e.g., log file 214, periodically. Compacting the smaller log files 204C, 204D, and 204E into the larger log file 214 can improve read performance. The Hadoop™ engine 206 can access the log file 214 using a Hadoop™ job 216. Additionally or alternatively, a client, e.g., client device 112 of FIG. 1, or peers, e.g., the servers 106, 108, and 110, can access the table data stored in the log file 214 using a SQL query. An EVICTION BY CRITERIA clause in the DDL statement creating the database table 212 can define a working subset of data records to keep in-memory for high-performance queries. The working subset can be designated as operational data. Data records that are not in the set of operation data are evicted from memory, but remains in log files 204C, 204D, and 204E or log file 214 to satisfy queries or updates. The in-memory operational data is indexed for high-performance querying. In various implementations, the data in the log files 204C, 204D, and 204E or log file 214 may or may not be indexed.

An example pseudo command for creating a data store "example_readwritestore" is shown below in Table 3.

TABLE 3

```
CREATE DISTRIBUTED_STORE example_readwritestore
    NameNode '[some_file_system://some_port]'
    HomeDir 'overflow-tables'
    BatchSize 10
    BatchTimeInterval 2000
    QueuePersistent true
    MinorCompact true
    MajorCompact true
    MaxInputFileSize 12
    MinInputFileCount 4
    MaxIterationSize 3072
    MinorCompactionThreads 3
    MajorCompactionInterval 10
    MajorCompactionThreads 3;
```

The example command creates a new data store in the specified name node and home directory "overflow-tables." A queue that writes to the "example_readwritestore" on the distributed file system 104 can be persisted to local disk 118 (of FIG. 1). The flush engine 203 of the table data persistence engine 122 writes data in the queue 114 to the data store example_readwritestore" in batches as 10 MB each, as specified in the "BatchSize" parameter. The flush engine 203 flushes the queue 114 to the data store at least once every 2000 milliseconds according to the "BatchTimeInterval" parameter.

According to the example command as shown in Table 3, the compaction engine 213 of the table data persistence engine 122 performs minor and major compaction on the log files 204C, 204D, and 204E. In a minor compaction, the compaction engine 213 compacts eligible log files, e.g., the log files 204C, 204D, and 204E to remove older history when a combined size of the eligible log files reaches a certain size, e.g., 3072 MB, as specified by the "MaxIterationSize" parameter. The compaction engine 213 performs minor compaction on files over 12 MB in size, as specified in the "MaxInputFileSize" parameter. The compaction engine 213 performs minor compaction after at least three log files are created, as specified in the "MinInputFileCount" parameter. The compaction engine 213 performs the minor compaction using a maximum of three threads, as specified in the "MinorCompactionThreads" parameter.

The compaction engine 213 performs a major compaction every 10 minutes, as specified in the "MajorCompactionInterval" parameter. In a major compaction, the compaction engine 213 discards history of modifications to each data record as stored in the log file being compacted, and preserves the latest value of the data record. The compaction engine 213 performs the major compaction using a maximum of three threads, as specified in the "MajorCompactionThreads" parameter.

The flush engine 203 of the table data persistence engine 122 can stream operations on the database table 212 to the data store "example_readwritestore" base on the DDL statement that created the database table 212. An example DDL statement for creating the database table 212 is shown below in Table 4.

TABLE 4

```
CREATE TABLE example_table_2 (
    example_id INT NOT NULL PRIMARY KEY
    orig_airport VARCHAR (2000)
    dest_airport VARCHAR (2000)     )
PARTITION BY PRIMARY KEY
EVICTION BY CRITERIA (LAST_MODIFIED_INTERVAL > 300000)
EVICTION FREQUENCY 180 SECS
DISTRIBUTED_STORE (example_readwritestore);
```

The example DDL statement creates the database table 212 having a name "example_table_2." Table data of the database table 212 is persisted to the data store "example_readwritestore" in in read-write mode. The table data persistence engine 122 evicts operational data from memory according to the EVICTION BY CRITERIA parameter. In the example shown, data records that have not been updated for 300000 milliseconds (five minutes) are eligible for eviction. In addition, the table data persistence engine 122 actively checks for, and evicts, data every 180 seconds according to the "EVICTION FREQUENCY" parameter.

By default, a SQL query operates against the in-memory, operational data set of database table 212. A client that queries the full data set including in-memory data and data stored on the distributed file system 104 can use a connection property or a query hint to specify that data stored on distributed file system 104 is also queried. The connection property allows all queries in a connection to access the data stored on the distributed file system 104. The query hint allows a specific query to access the data stored on distributed file system 104. Example property settings are shown below in Table 5.

TABLE 5 sql> connect client 'localhost:[port]; query-DFS=true';
SELECT * from example_table_2 --PROPERTIES query-DFS = true \n;
SELECT * from example_table_2 --PROPERTIES query-DFS = true \n
    WHERE column-name = column-value The system can require that "query-DFS" property, which allows the query or queries to access data stored on the distributed file system 104, to be specified immediately after the table name. A "\n" operator or a new line after the "query-DFS" property can guarantee additional content, e.g., the "WHERE" clause, does not be discarded.

A data manipulation language (DML) command, e.g., UPDATE, DELETE, or TRUNCATE TABLE may always operate against the full data set, with or without a "query-DFS" property being set. A PUT INTO statement can be utilized to speed up operations on data stored on the distributed file system 104 using a syntax that is similar to an INSERT statement. Pseudo code of an example PUT INTO statement for inserting into database table 212 is shown below in Table 6.

TABLE 6

PUT INTO example_table_2
{ VALUES (... )|
    SELECT ...
}

The PUT INTO statement differs from a conventional INSERT or UPDATE statement in that the server 108 bypasses operations of checking existing primary key values before executing the statement. If a data record having a same key exists in the database table 212, the PUT INTO will overwrite the older data record value. If no data record having the same primary key, PUT INTO operates like a conventional INSERT statement. Removing the primary key check can speedup execution where updating large number of data records stored in distributed file system 104.

Hadoop™ jobs 208 and 216 can access both the read-only data, e.g., log files 204A and 204B, and the read-write data, e.g., log files 204C, 204D, and 204E or log file 214. The Hadoop™ engine 206 can configure Hadoop™ jobs 208 and 216 use various parameters. Example parameters are shown below in Table 7.

TABLE 7

| Property | Applicable Table Type | Description |
| --- | --- | --- |
| INPUT_TABLE | Write-Only (WO), Read-Write (RW) | A table name in format schema_name.table_name |
| HOME_DIR | WO, RW | Name of a directory in the distributed file system corresponding to the HomeDir parameter in the CREATE_DFSTORE statement |
| START_TIME_MS | WO, RW | Identifies an earliest timestamp (in milliseconds) for table events to process in a Hadoop ™ job. The Hadoop ™ job will process events that occurred after this timestamp. |
| END_TIME_MS | WO, RW | Identifies a latest timestamp (in milliseconds) for table events to |

TABLE 7-continued

| Property | Applicable Table Type | Description |
| --- | --- | --- |
| | | process in a Hadoop ™ job. The Hadoop ™ job will process events that occurred before this timestamp. |
| CHECKPOINT | RW | A Hadoop ™ job processes the latest data record values instead of records over time. |

Example code for configuring a Hadoop™ job to access a table and a directory specified as arguments are listed below in Table 8. The START_TIME_MS, and END_TIME_MS parameters are not shown.

TABLE 8

JobConf conf = new JobConf(getConf( ));
conf.setJobName("Busy Airport Count");
Path outputPath = new Path(args[0]);
Path intermediateOutputPath = new Path(args[0] + "_int");
String dfsHomeDir = args[1];
String tableName = args[2];
outputPath.getFileSystem(conf).delete(outputPath, true);
intermediateOutputPath.getFileSystem(conf).delete(
    intermediateOutputPath, true);
conf.set(EventInputFormat.HOME_DIR, dfsHomeDir);
conf.set(EventInputFormat.INPUT_TABLE, tableName);
conf.setBoolean(EventInputFormat.CHECKPOINT, false);
conf.setInputFormat(EventInputFormat.class);
conf.setMapperClass(ExampleMapper.class);

The data stored in distributed file system 104 can then be accessed through a map procedure in a mapper implementation of the Hadoop™ MapReduce using key-value pairs. An example mapper implementation "ExampleMapper" is shown below in Table 9.

TABLE 9 public static class ExampleMapper extends MapReduceBase
        implements Mapper<Object, Row, Text, IntWritable> {
    private final static IntWritable countOne = new IntWritable(1);
    private final Text reusableText = new Text( );
    @Override
    public void map(Object key, Row row,
            OutputCollector<Text, IntWritable> output,
            Reporter reporter) throws IOException {
        String origAirport;
        String destAirport;
        try {
            ResultSet rs = row.getRowAsResultSet( );
            origAirport = rs.getString("orig_airport");
            destAirport = rs.getString("dest_airport");
            reusableText.set(origAirport);
            output.collect(reusableText, countOne);
            reusableText.set(destAirport);
            output.collect(reusableText, countOne);
        } catch (SQLException e) {
            e.printStackTrace( );
        } // end of try
    } // end of void map
} // end of ExampleMapper The map method as shown in Table 9 can accumulate values. In various implementations, a map method can evaluate each data record against come condition. The Hadoop™ engine 206 can sort output of the mapper before sending the sorted output to a reducer. The reducer can reduce the set of intermediate values and uses an output formatter to generate output.

The Hadoop™ engine 206 can use the output formatter to perform tasks of writing data back into a database table, e.g., the database table 212. The output formatter can have a first property "OUTPUT_TABLE" that specifies a name of a database table to write to, in the format of schema_name.table_name. The output formatter can have a second property "OUTPUT_URL" that specifies a string to connect to a parallel processing database system, e.g., the system 100. Example code for configuring a formatter is provided below in Table 10. The code configures the formatter to insert data into a database table 220, which has a schema name "APP" and a table name "BUSY_AIRPORT."

TABLE 10

```
JobConf topConf = new JobConf(getConf( ));
topConf.setJobName("Top Busy Airport");
String dfsFS = topConf.get("fs.defaultFS");
URI dfsUri = URI.create(dfsFS);
dfsUri.getHost( );
topConf.set(OutputFormat.OUTPUT_URL, "[a host and a port]");
topConf.set(OutputFormat.OUTPUT_TABLE,"APP.BUSY_AIRPORT");
topConf.setReducerClass(TopBusyAirportReducer.class);
topConf.setOutputKeyClass(Key.class);
topConf.setOutputValueClass(BusyAirportModel.class);
topConf.setOutputFormat(OutputFormat.class);
```

The Hadoop™ engine 206 writes data to the database table 220 using the PUT INTO command as shown above in Table 6. The output can be written using key/value pairs. Example code for writing key/value pairs using the "OutputFormat" configuration of Table 10 is shown below in Table 11.

TABLE 11

```
public static class TopBusyAirportReducer extends MapReduceBase
    implements Reducer<Text, StringIntPair, Key, BusyAirportModel> {
  @Override
  public void reduce(Text token, Iterator<StringIntPair> values,
      OutputCollector<Key, BusyAirportModel> output, Reporter
      reporter) throws IOException {
    String topAirport = null;
    int max = 0;
    while (values.hasNext( )) {
      StringIntPair v = values.next( );
      if (v.getSecond( ) > max) {
        max = v.getSecond( );
        topAirport = v.getFirst( );
      } // end if
    } // end while
    BusyAirportModel busy = new BusyAirportModel(topAirport, max);
    output.collect(new Key( ), busy);
  } // end reduce
} // end TopBusyAirportReducer
```

A new Key value is created before the write. The output value is an instance of BusyAirportModel, which can be a Java database connectivity (JDBC) class that defines the schema of the output table, e.g., the database table 220.

Figure 3:
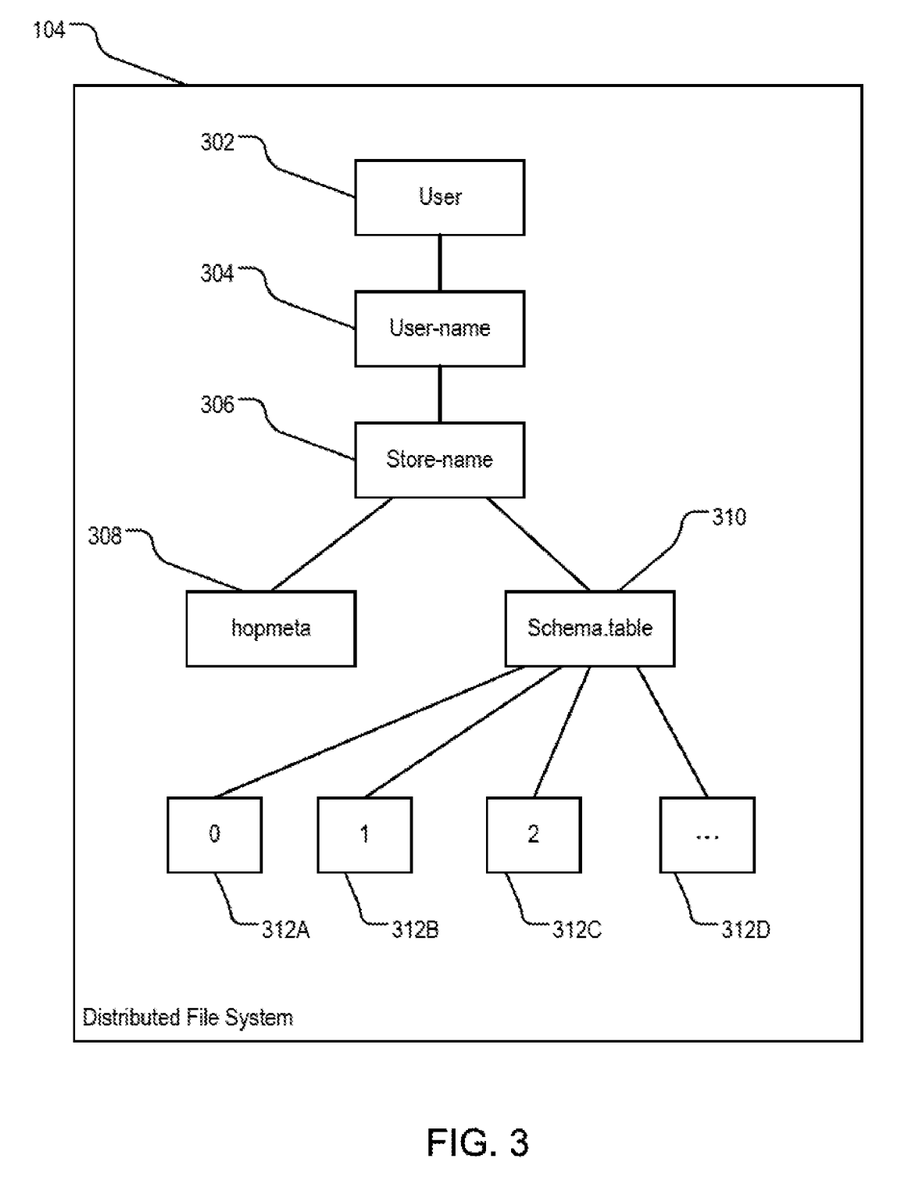
FIG. 3 is a block diagram illustrating a directory structure of an example distributed file system storing table data.

FIG. 3 is a block diagram illustrating a directory structure of an example distributed file system 104 storing table data. The distributed file system can have a user directory 302 for storing directories of users of the distributed file system 104. The user directory 302 can have a subdirectory 304 of a particular user, e.g., "example_user." Under the subdirectory 304 can be one or more home directories 306 for a data store, e.g., the home directory "stream-tables" for data store "streamingstore" of Table 1 or the home directory "overflow-tables" for data store "example_readwritestore" of Table 3. The home directory of a data store can be a root directory of that data store.

A metadata directory 308 can be located under each home directory 306. The metadata directory 308 can be a metadata directory 308. The metadata directory 308 can store one or more metadata files. A table schema, including DML statements for creating database tables, is stored in the meta files. The metadata files can be used to recreate the database tables.

A table directory 310 can be located under each home directory 306. The table directory 310 can be named under a convention of [schema_name].[table_name], e.g. APP.BUSY_AIRPORT. The table directory 310 can have multiple subdirectories each corresponding to a logical bucket of data. For example, the table directory 310 has bucket directories 312A, 312B, 312C, and 312D. Each of servers 106, 108, through 110 that stores logical buckets of a partitioned database table's data maintains an asynchronous queue of events for those buckets. While the flush engine 203 (of FIG. 2) flushes contents of the asynchronous queues, the flush engine 203 creates new log files for those buckets. Each bucket corresponds to a dedicated bucket directory 312A, 312B, 312C, or 312D.

Each log file stored in bucket directories 312A, 312B, 312C, or 312D can have the format of bucket_number-sequence_number-timestamp.extension. The timestamp of each log file indicates the file stores table operations that occurred earlier than the timestamp. The file timestamps can be used in Hadoop™ jobs to process records for a specified interval.

For tables that use read-only persistence, the queue on a primary member does not sort the events for the buckets the queue manages. Instead, the queue persists the unsorted operations to the distributed file system. Multiple batches can be persisted to the same file. Each file may include multiple entries for the same data record, as updates and delete operations are appended. The same data record value may appear in multiple persistence files.

For tables that use read-write persistence, the queue buffers and sorts some or all operations that occur for a given bucket before persisting queued events to the distributed file system. Each ordered batch of events creates a new file in data store. The compaction engine 213 (of FIG. 2) performs periodic compaction to merge smaller files into larger files to improve read performance. Hadoop™ jobs can use the timestamps of individual persistence to perform incremental processing of values over a period of time. Also, because the events are ordered in the persistence files, individual values in a file can be accessed efficiently using primary key queries from clients.

Figure 4:
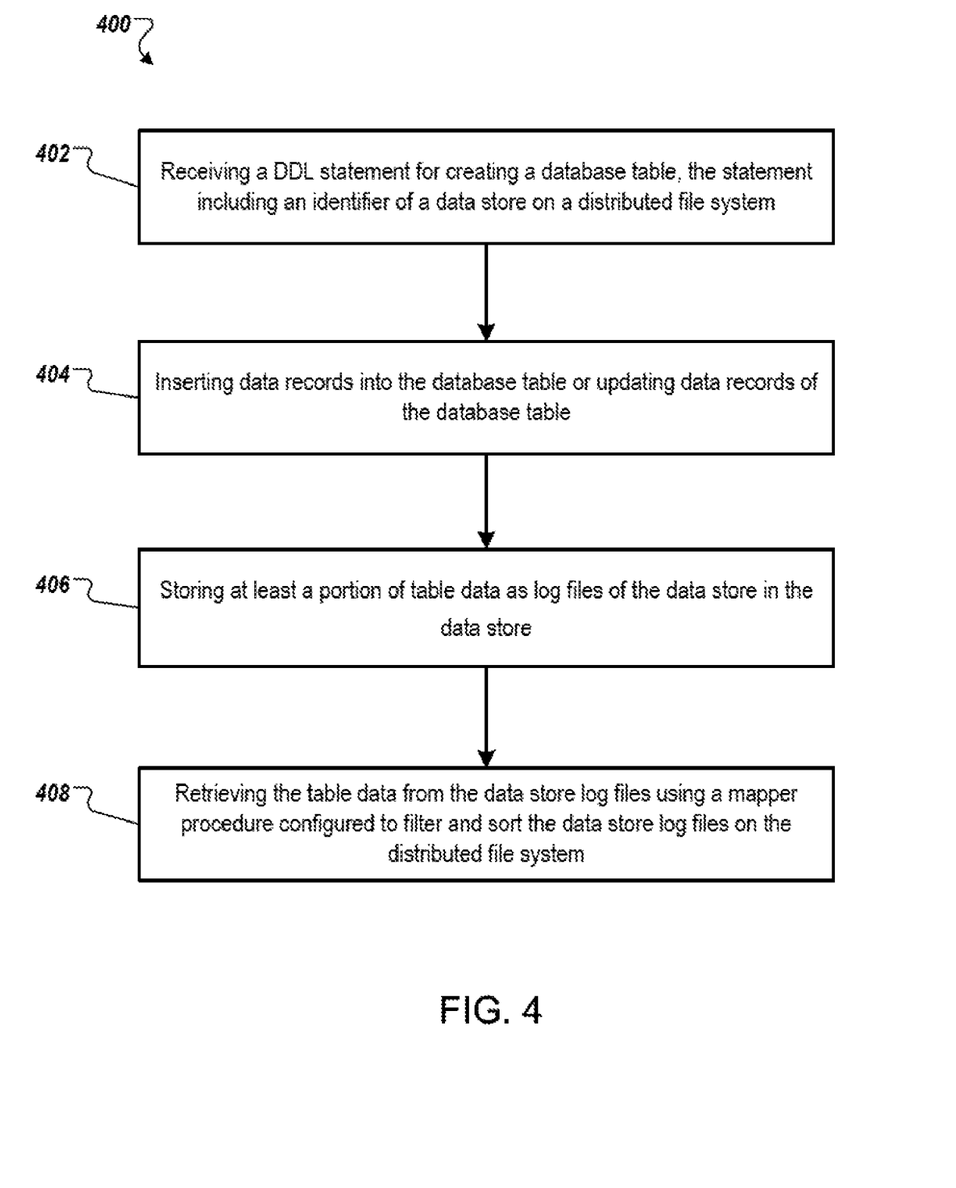
FIG. 4 is a flowchart illustrating a first example process of table data persistence.

FIG. 4 is a flowchart illustrating an example process 400 of table data persistence. The procedure 400 can be performed by an example system, e.g., the system 100 of FIG. 1.

The system receives (402) a DDL statement for creating a database table. The statement includes an identifier of a data store on the distributed file system. The identifier can be a data store name, as specified in a command creating the data store. The DDL statement can include a parameter specifying that the table data be stored in the data store in a write-only mode. The data stored in the write-only mode is ineligible for direct access by a SQL query statement. The DDL statement can include a parameter specifying that the data be stored in the data store in a read-write mode, wherein the data stored in the read-write mode is eligible for direct access by a SQL query statement In response to receiving data populating the database table, the system performs the operations (404) of inserting data records into the database table or updating data records of the database table. In addition, the system can receive DML statements for deleting the data records or truncating the database table.

The system stores (406) at least a portion of table data as data store log files on the distributed file system. The table data includes at least one of the received data, the updated data, or history of deleting the data. Storing at least a portion of the table data as log files of the data store in the data store can include evicting a data record. The system can determine that a data record of data satisfies a condition of moving a data record from a memory device to the distributed file system as specified in an eviction setting in the DDL statement. In response, the system can move the data record from a memory device to the data store. In some implementations, the system determines that an amount of data records stored in a memory device satisfies a memory overflow condition. In response, the system moves one or more data records from the memory device to the data store. In some implementations, the system stores a DML statement defining a schema of the database table in a metadata file in the data store.

Upon receiving a request to access the data records of the database table or a history of operations manipulating the database table, the system retries (408) the table data from the data store log files using a mapper procedure configured to filter and sort the data store log files on the distributed file system. The mapper procedure can be a component of a Hadoop™ system.

Figure 5:
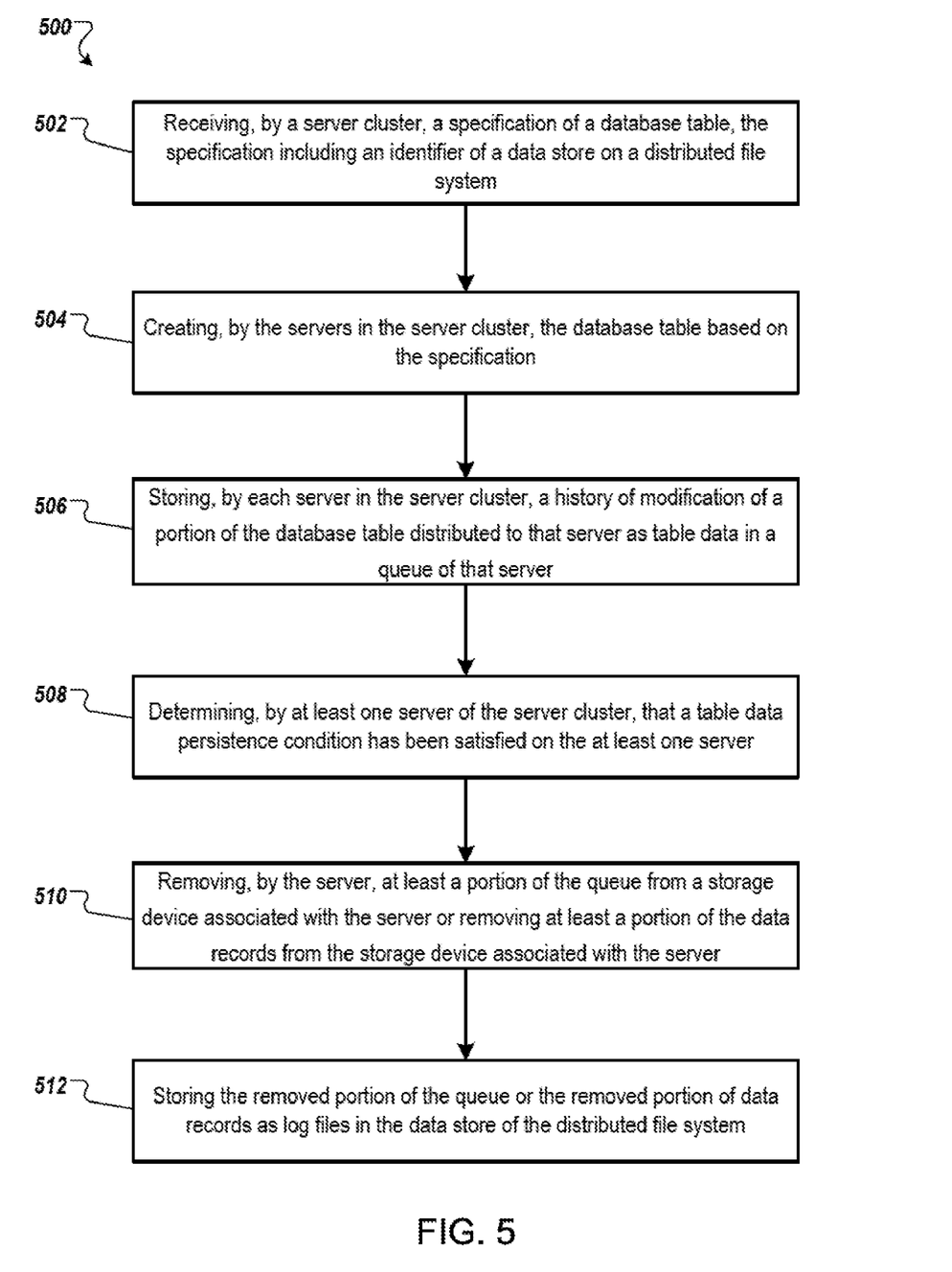
FIG. 5 is a flowchart illustrating a second example process of table data persistence.

FIG. 5 is a flowchart illustrating an example process 500 of table data persistence. The procedure 400 can be performed by an example system, e.g., the system 100 of FIG. 1.

A server cluster, e.g., the server cluster 102 of FIG. 1, receives (502) a specification of a database table. The specification includes an identifier, e.g., a data store name, of a data store on a distributed file system, e.g., the distributed file system 104. The server cluster includes multiple servers and multiple computers. Each server is a computer program executing on one or more of the computers. The server cluster is different from the distributed file system, which can be implemented on different computers.

The specification can include a parameter specifying that the table data be stored in the data store in a write-only mode, wherein the data stored in the write-only mode is ineligible for direct access by a SQL query statement issued to the server cluster. The specification can include a parameter specifying that the data be stored in the data store in a read-write mode, wherein the data stored in the read-write mode is eligible for direct access by a SQL query statement issued to the server cluster. By default, the parameter is for the read-write mode.

The servers in the server cluster creates (504) the database table based on the specification. The database table is distributed among each server of the server cluster according to a partition setting in a DDL statement creating the database table.

Each server in the server cluster stores (506) a history of modification of a portion of the database table distributed to that server as table data in a queue of that server. The history includes events, and associated timestamps, of inserting data records into the database table and events, and associated timestamps, of changing data records in the database table. The queue of that server and data records of the database table that are distributed to that server are stored on a storage device of the one or more computers allocated to that server.

At least one server, e.g., the server 108 of the server cluster determines (508) that a table data persistence condition has been satisfied on that server, server 108. Determining that the table data persistence condition has been satisfied can include determining that a data record of the database table satisfies a condition of moving a data record from a memory device to the distributed file system as specified in an eviction setting in the specification, or determining that an amount of data records stored in a memory device satisfies a memory overflow condition in the specification.

In response, the server 108 persists the table data. Persisting the table data includes operations 510 of removing, by the server 108, at least a portion of the queue from a storage device associated with the server 108 or removing at least a portion of the data records from the storage device associated with the server 108. The removed portion of the queue or the removed portion of data records as log files will be readable by a mapper of a Hadoop™ system from the data store.

Persisting the table data includes storing (512), the removed portion of the queue or the removed portion of data records as log files in the data store of the distributed file system. In some implementations, persisting the table data can include storing a DML statement defining a schema of the database table in a metadata file in the data store.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   receiving a command for creating a database table, the command including an identifier of a data store persisted on a distributed file system;
   creating the database table in response to the command;
   receiving and inserting updated data as one or more data records in the database table;

storing at least a portion of the data records as log files of the data store on the distributed file system, comprising:
  determining that an amount of data records stored in a memory device satisfies a memory overflow condition; and
  in response, moving one or more data records from the memory device to the log files; and
in response to receiving a request to access the data records stored on the distributed file system, retrieving the data records from the log files using a mapper procedure of a plurality of mapper procedures of a mapping process.

2. The method of claim 1, wherein the command includes a data definition language (DDL) statement.

3. The method of claim 2, wherein storing at least a portion of the data records as log files of the data store comprises:
  determining that a data record satisfies a condition of evicting data records from a memory device to the distributed file system as specified in an eviction setting in the DDL statement; and
  in response, moving the data record from the memory device to the log files.

4. The method of claim 1, wherein the mapper is configured to filter and sort the log files.

5. The method of claim 1 comprising storing a data manipulation language (DML) statement defining a schema of the database table in a metadata file in the data store.

6. A non-transitory storage device storing instructions operable to cause one or more computers to perform operations comprising:
  receiving a command for creating a database table, the command including an identifier of a data store persisted on a distributed file system;
  creating the database table in response to the command;
  receiving and inserting updated data as one or more data records in the database table;
  storing at least a portion of the data records as log files of the data store on the distributed file system, comprising:
    determining that an amount of data records stored in a memory device satisfies a memory overflow condition; and
    in response, moving one or more data records from the memory device to the log files; and
  in response to receiving a request to access the data records stored on the distributed file system, retrieving the data records from the log files using a mapper procedure of a plurality of mapper procedures of a mapping process.

7. The non-transitory storage device of claim 6, wherein the command includes a data definition language (DDL) statement.

8. The non-transitory storage device of claim 7, wherein storing at least a portion of the data records as log files of the data store comprises:
  determining that a data record satisfies a condition of evicting data records from a memory device to the distributed file system as specified in an eviction setting in the DDL statement; and
  in response, moving the data record from the memory device to the log files.

9. The non-transitory storage device of claim 6, wherein the mapper is configured to filter and sort the log files.

10. The non-transitory storage device of claim 6, the operations comprising storing a data manipulation language (DML) statement defining a schema of the database table in a metadata file in the data store.

11. A system comprising:
  one or more computers; and
  a non-transitory storage device storing instructions operable to cause the one or more computers to perform operations comprising:
  receiving a command for creating a database table, the command including an identifier of a data store persisted on a distributed file system;
  creating the database table in response to the command;
  receiving and inserting updated data as one or more data records in the database table;
  storing at least a portion of the data records as log files of the data store on the distributed file system, comprising:
    determining that an amount of data records stored in a memory device satisfies a memory overflow condition; and
    in response, moving one or more data records from the memory device to the log files; and
  in response to receiving a request to access the data records stored on the distributed file system, retrieving the data records from the log files using a mapper procedure of a plurality of mapper procedures of a mapping process.

12. The system of claim 11, wherein the command includes a data definition language (DDL) statement.

13. The system of claim 12, wherein storing at least a portion of the data records as log files of the data store comprises:
  determining that a data record satisfies a condition of evicting data records from a memory device to the distributed file system as specified in an eviction setting in the DDL statement; and
  in response, moving the data record from the memory device to the log files.

14. The system of claim 11, wherein the mapper is configured to filter and sort the log files.

15. The system of claim 11, the operations comprising storing a data manipulation language (DML) statement defining a schema of the database table in a metadata file in the data store.

* * * * *